US008477852B2

(12) United States Patent
Jia

(10) Patent No.: US 8,477,852 B2
(45) Date of Patent: Jul. 2, 2013

(54) UNIFORM VIDEO DECODING AND DISPLAY

(75) Inventor: Wei Jia, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1358 days.

(21) Appl. No.: 11/821,069

(22) Filed: Jun. 20, 2007

(65) Prior Publication Data

US 2008/0317138 A1  Dec. 25, 2008

(51) Int. Cl.
*H04N 7/00* (2011.01)
(52) U.S. Cl.
USPC ............ 375/240.26; 375/240.15; 375/240.12; 375/240.25; 370/231; 715/200; 711/100
(58) Field of Classification Search
USPC ............. 375/240.26, 240.12, 240.15, 240.25; 711/100; 715/200; 370/231
See application file for complete search history.

(56) References Cited

U.S. PATENT DOCUMENTS

| | | | |
|---|---|---|---|
| 5,163,136 A | 11/1992 | Richmond | |
| 5,189,671 A | 2/1993 | Cheng | |
| 5,774,206 A | 6/1998 | Wasserman et al. | |
| 5,796,743 A | 8/1998 | Bunting et al. | |
| 5,821,886 A | 10/1998 | Son | |
| 6,008,745 A | 12/1999 | Zandi et al. | |
| 6,023,088 A | 2/2000 | Son | |
| 6,041,403 A | 3/2000 | Parker et al. | |
| 6,047,357 A | 4/2000 | Bannon et al. | |
| 6,144,322 A | 11/2000 | Sato | |
| 6,246,347 B1 | 6/2001 | Bakhmutsky | |
| 6,298,370 B1 | 10/2001 | Tang et al. | |
| 6,317,063 B1 | 11/2001 | Matsubara | |
| 6,339,658 B1 | 1/2002 | Moccagatta et al. | |
| 6,441,757 B1 | 8/2002 | Hirano | |
| 6,462,744 B1 | 10/2002 | Mochida et al. | |
| 6,480,489 B1 | 11/2002 | Muller et al. | |
| 6,543,023 B2 | 4/2003 | Bessios | |
| 6,552,673 B2 | 4/2003 | Webb | |
| 6,563,440 B1 | 5/2003 | Kangas | |
| 6,563,441 B1 | 5/2003 | Gold | |
| 6,577,681 B1 | 6/2003 | Kimura | |

(Continued)

FOREIGN PATENT DOCUMENTS

| | | |
|---|---|---|
| CN | 101017574 | 8/2007 |
| JP | 06276394 | 9/1994 |

(Continued)

OTHER PUBLICATIONS

English Translation of Office Action for Chinese Patent Application No. 200810212373.X, Entitled: Decoding Variable Length Codes in JPEG Applications.

(Continued)

*Primary Examiner* — Beemnet Dada
*Assistant Examiner* — Sayed Beheshti Shirazi

(57) ABSTRACT

Described herein are embodiments for decoding and displaying video data. Several of these embodiments utilize a unified frame buffer management system, to facilitate better memory management in decoding and displaying compressed video. One approach describes a method of decoding and displaying compressed video data. The method involves receiving a compressed video frame, and allocating a frame buffer for use in decoding the compressed video frame. A frame identifier is assigned to the allocated frame buffer. The compressed video frame is decoded into the frame buffer, and the frame identifier is passed to a display module.

13 Claims, 7 Drawing Sheets

System 112

U.S. PATENT DOCUMENTS

| | | | |
|---|---|---|---|
| 6,587,057 B2 | 7/2003 | Scheuermann | |
| 6,654,539 B1* | 11/2003 | Duruoz et al. | 386/343 |
| 6,675,282 B2 | 1/2004 | Hum et al. | |
| 6,696,992 B1 | 2/2004 | Chu | |
| 6,795,503 B2 | 9/2004 | Nakao et al. | |
| 6,839,624 B1 | 1/2005 | Beesley et al. | |
| 6,891,976 B2 | 5/2005 | Zheltov et al. | |
| 6,981,073 B2 | 12/2005 | Wang et al. | |
| 7,016,547 B1 | 3/2006 | Smirnov | |
| 7,051,123 B1 | 5/2006 | Baker et al. | |
| 7,068,407 B2 | 6/2006 | Sakai et al. | |
| 7,068,919 B2 | 6/2006 | Ando et al. | |
| 7,069,407 B1 | 6/2006 | Vasudevan et al. | |
| 7,074,153 B2 | 7/2006 | Usoro et al. | |
| 7,113,115 B2 | 9/2006 | Partiwala et al. | |
| 7,113,546 B1 | 9/2006 | Kovacevic et al. | |
| 7,119,813 B1 | 10/2006 | Hollis et al. | |
| 7,129,862 B1 | 10/2006 | Shirdhonkar et al. | |
| 7,132,963 B2 | 11/2006 | Pearlstein et al. | |
| 7,158,539 B2 | 1/2007 | Zhang et al. | |
| 7,209,636 B2 | 4/2007 | Imahashi et al. | |
| 7,230,986 B2 | 6/2007 | Wise et al. | |
| 7,248,740 B2 | 7/2007 | Sullivan | |
| 7,286,543 B2 | 10/2007 | Bass et al. | |
| 7,289,047 B2 | 10/2007 | Nagori | |
| 7,324,026 B2 | 1/2008 | Puri et al. | |
| 7,372,378 B2 | 5/2008 | Sriram | |
| 7,372,379 B1 | 5/2008 | Jia et al. | |
| 7,432,835 B2 | 10/2008 | Ohashi et al. | |
| 7,606,313 B2 | 10/2009 | Raman et al. | |
| 7,627,042 B2 | 12/2009 | Raman et al. | |
| 7,724,827 B2 | 5/2010 | Liang et al. | |
| 7,765,320 B2* | 7/2010 | Vehse et al. | 709/238 |
| 2001/0010755 A1 | 8/2001 | Ando et al. | |
| 2001/0026585 A1 | 10/2001 | Kumaki | |
| 2002/0094031 A1 | 7/2002 | Ngai et al. | |
| 2003/0043919 A1 | 3/2003 | Haddad | |
| 2003/0156652 A1* | 8/2003 | Wise et al. | 375/240.26 |
| 2003/0179706 A1* | 9/2003 | Goetzinger et al. | 370/231 |
| 2003/0196040 A1 | 10/2003 | Hosogi et al. | |
| 2004/0028142 A1 | 2/2004 | Kim | |
| 2004/0056787 A1 | 3/2004 | Bossen | |
| 2004/0059770 A1 | 3/2004 | Bossen | |
| 2004/0067043 A1* | 4/2004 | Duruoz et al. | 386/68 |
| 2004/0081245 A1 | 4/2004 | Deeley et al. | |
| 2004/0096002 A1 | 5/2004 | Zdepski et al. | |
| 2004/0130553 A1 | 7/2004 | Ushida et al. | |
| 2004/0145677 A1 | 7/2004 | Raman et al. | |
| 2004/0158719 A1 | 8/2004 | Lee et al. | |
| 2005/0008331 A1 | 1/2005 | Nishimura et al. | |
| 2005/0123274 A1 | 6/2005 | Crinon et al. | |
| 2005/0147375 A1 | 7/2005 | Kadono | |
| 2005/0182778 A1 | 8/2005 | Heuer et al. | |
| 2005/0207497 A1* | 9/2005 | Rovati et al. | 375/240.16 |
| 2006/0013321 A1 | 1/2006 | Sekiguchi et al. | |
| 2006/0083306 A1* | 4/2006 | Hsu | 375/240.15 |
| 2006/0133500 A1 | 6/2006 | Lee et al. | |
| 2006/0256120 A1 | 11/2006 | Ushida et al. | |
| 2007/0006060 A1* | 1/2007 | Walker | 715/500.1 |
| 2007/0288971 A1* | 12/2007 | Cragun et al. | 725/90 |
| 2008/0162860 A1* | 7/2008 | Sabbatini et al. | 711/170 |
| 2008/0317138 A1 | 12/2008 | Jia | |

FOREIGN PATENT DOCUMENTS

| | | |
|---|---|---|
| JP | 09261647 A2 | 10/1997 |
| JP | 2000049621 | 2/2000 |
| KR | 1020030016859 | 3/2003 |
| TW | 200520535 | 12/2003 |
| TW | 200428879 | 11/2004 |
| WO | 01/24425 | 4/2001 |

OTHER PUBLICATIONS

Miska Hannuksela, Picture Decoding Method, USPTO Provisional Application filed Feb. 18, 2003; U.S. Appl. No. 60/448,189.

Ting-Kun Yeh et. al, Video Decoder, USPTO Provisional Application filed Dec. 3, 2003; U.S. Appl. No. 60/526,294.

* cited by examiner

System 112

Flowchart 300

System 400

Flowchart 500

Dataflow 700

UNIFORM VIDEO DECODING AND DISPLAY

BACKGROUND

1. Field of the Invention

Embodiments of the present invention relate to decoding compressed video information.

2. Related Art

A common approach to video compression schemes involves tracking the changes between one frame of video and the next. Rather than storing separate, complete images for every frame of video, most video compression standards involve providing one or more reference frames, and building the majority of frames by noting how these reference frames change.

For example, in some of the more popular video compression standards, a single complete image is encoded at the beginning of a sequence; such a complete image is described as an intra frame (I frame). This I frame provides the reference for one or more predicted frames (P frames), which rely upon a previously decoded frame (either the I frame, or an earlier P frame). The majority of the encoded video will be made up of bi-predictive frames (B frames), which rely upon several previously decoded reference frames (the I frame, or P frames).

The exact usage of the reference frames varies, across different video encoding schemes. For example, under an MPEG-2 encoding scheme, only the two most recent reference frames may be used as reference frames; under the H.264 encoding scheme, however, reference frames may be needed for a much longer period of time, and so need to be retained.

Decoding compressed video, at present, is a platform specific task. The decoder used, for example, to play back a video on a computer is frequently written in a way that locks it to the platform for which it was written, e.g., specific memory handling tasks are built into the decoder. Accordingly, developing a decoder for a different platform, e.g., a portable media playback device, generally involves rewriting the decoder entirely.

SUMMARY

Described herein are embodiments for decoding and displaying video data. Several of these embodiments utilize a unified frame buffer management system, to facilitate better memory management in decoding and displaying compressed video. One approach describes a method of decoding and displaying compressed video data. The method involves receiving a compressed video frame, and allocating a frame buffer for use in decoding the compressed video frame. A frame identifier is assigned to the allocated frame buffer. The compressed video frame is decoded into the frame buffer, and the frame identifier is passed to a display module.

Another approach involves a system for a video decoding and display. The system includes a player module for receiving a bit stream of compressed video data, and for passing information throughout the system. The system also includes a core decoder for decoding compressed video data. A display module is included, for outputting a video stream. A frame buffer manager is also included, for allocating frame buffers, within a frame buffer module.

In another embodiment, a method of operating a frame buffer manager is described. The method involves receiving a request for frame buffer. Next, it is determined if an unneeded frame buffer is available for recycling; if such an unneeded frame buffer is available, it is recycled for use as the requested frame buffer. If an unneeded frame buffer is not available, the requested frame buffer is allocated from available memory.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
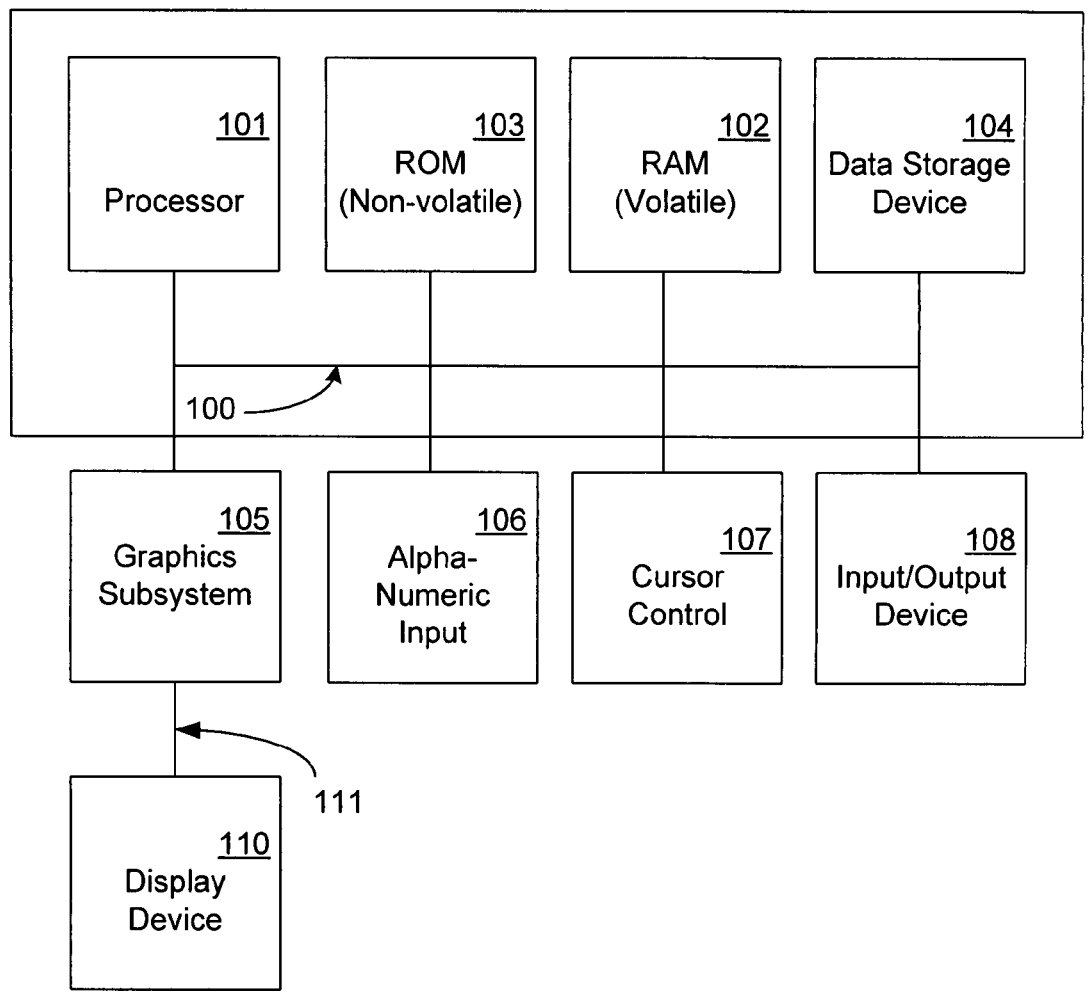
FIG. 1 is a block diagram of an exemplary computer system upon which embodiments of the present invention may be implemented.

Reference will now be made in detail to several embodiments of the invention. While the invention will be described in conjunction with the alternative embodiment(s), it will be understood that they are not intended to limit the invention to these embodiments. On the contrary, the invention is intended to cover alternative, modifications, and equivalents, which may be included within the spirit and scope of the invention as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a process or method. Although steps and sequencing thereof are disclosed in figures herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Although embodiments described herein may make reference to a CPU and a GPU as discrete components of a computer system, those skilled in the art will recognize that a CPU and a GPU can be integrated into a single device, and a CPU and GPU may share various resources such as instruction logic, buffers, functional units and so on; or separate resources may be provided for graphics and general-purpose operations. Accordingly, any or all of the circuits and/or functionality described herein as being associated with GPU could also be implemented in and performed by a suitably configured CPU.

Further, while embodiments described herein may make reference to a GPU, it is to be understood that the circuits and/or functionality described herein could also be implemented in other types of processors, such as general-purpose or other special-purpose coprocessors, or within a CPU.

Basic Computing System

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. System 112 can be implemented as, for example, a desktop computer system or server computer system having a powerful general-purpose CPU coupled to a dedicated graphics rendering GPU. In such an embodiment, components can be included that add peripheral buses, specialized audio/video components, IO devices, and the like.

Similarly, system 112 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 112 can also be implemented as a "system on a chip", where the electronics (e.g., the components 101, 103, 105, 106, and the like) of a computing device are wholly contained within a single integrated circuit die. Examples include a hand-held instrument with a display, a car navigation system, a portable entertainment system, and the like.

Computer system 112 comprises an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Moreover, computer system 112 also comprises a data storage device 104 (e.g., hard disk drive) for storing information and instructions.

Computer system 112 also comprises an optional graphics subsystem 105, an optional alphanumeric input device 106, an optional cursor control or directing device 107, and signal communication interface (input/output device) 108. Optional alphanumeric input device 106 can communicate information and command selections to central processor 101. Optional cursor control or directing device 107 is coupled to bus 100 for communicating user input information and command selections to central processor 101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network), or can receive data (e.g., a digital television signal). Computer system 112 may also comprise graphics subsystem 105 for presenting information to the computer user, e.g., by displaying information on an attached display device 110, connected by a video cable 111. In some embodiments, graphics subsystem 105 is incorporated into central processor 101. In other embodiments, graphics subsystem 105 is a separate, discrete component. In other embodiments, graphics subsystem 105 is incorporated into another component. In other embodiments, graphics subsystem 105 is included in system 112 in other ways.

Video Playback System

In the following embodiments, a modular approach to video decoding and playback is described. In one embodiment, the use of a frame buffer manager is described. This frame buffer manager allows for more efficient utilization of the memory buffer in video playback, by removing the task of buffer allocation from the core decoder component of a video playback system.

Another approach is described, in which the platform specific elements in a video playback system are separated from the core video decoder. This approach offers a number of advantages, when developing video playback devices. First, this separation allows for a uniform approach to video playback: the platform specific elements of the video player are consistent, and only the core decoder needs to change, in order to support different video compression schemes. Second, because the core decoder is no longer platform specific, developing a video playback device for a different platform need not involve re-creating the decoder.

It is understood that, while the following embodiments describe operations in terms of frames, embodiments are well suited to applications involving other presentations of video data. For example, in an embodiment involving the H.264 encoding scheme, slices can be used, rather than requiring full frames of data.

Video Bitstream

Figure 2:
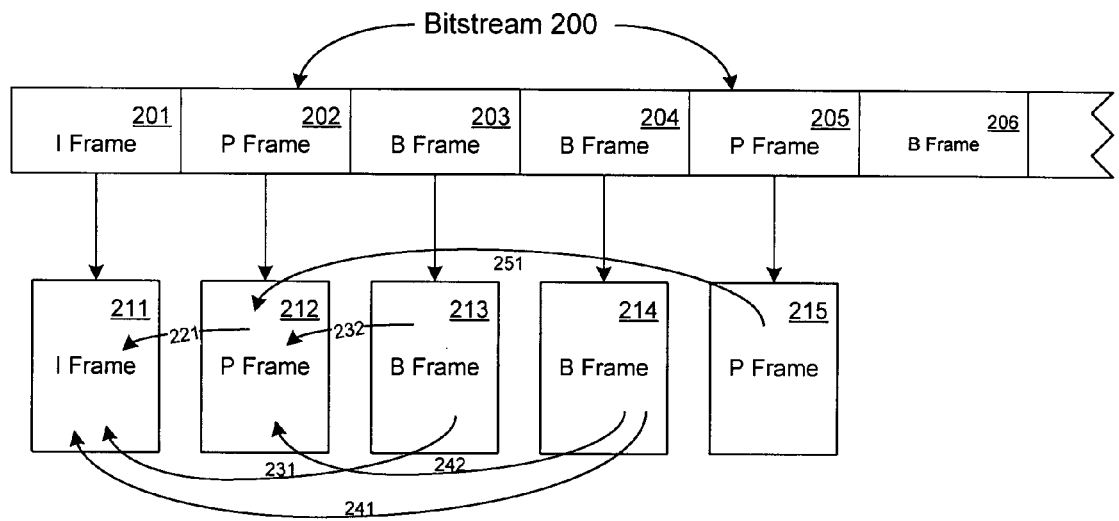
FIG. 2 is a depiction of an exemplary bitstream, in accordance with one embodiment.

With reference now to FIG. 2, an exemplary bitstream 200 is depicted, in accordance with one embodiment. While bitstream 200 is shown as incorporating specific, enumerated features, elements, and orderings, it is understood that embodiments are well suited to applications involving additional, fewer, or different features, elements, or arrangements. In particular, it is understood that the encoding order of frame data, as shown in bitstream 200, is intended as exemplary and illustrative only.

In some embodiments, compressed video data is passed to a video playback system or module in the form of a stream of binary data, e.g., a bitstream like bitstream 200. In such an embodiment, a bitstream may begin with some identifying header information, e.g., identifying the compression/decompression scheme (codec) to be used to decode the compressed video information, or some information associated with digital rights management (DRM).

Bitstream 200 is shown as beginning with encoded I frame 201. As discussed previously, an intra frame (I frame) represents a complete image; it can be viewed as being synonymous with a still image. Bitstream 200 continues with encoded P frame 202, encoded B frame 203, encoded B frame 204, encoded P frame 205, and encoded B frame 206.

A video playback device, presented with bitstream 200, would extract I frame 211 from bitstream 200. Next, the video playback device would decode P frame 212. P frame 212 is a predictive frame, and relies upon another reference frame; as indicated by arrow 221, P frame 212 relies upon I frame 211.

In decoding B frame 213, a bi-predictive frame, the video playback device would reference two reference frames, e.g., I frame 211, as indicated by arrow 231, and P frame 212, as indicated by arrow 232. Decoding B frame 214 would require similar reference frames, as indicated by arrows 241 and 242, while decoding P frame 215 would require reference to only a single preceding reference frame, e.g., P frame 212.

Depending upon the codec in use, different reference frames may be needed to decode a frame. For example, in the MPEG-2 codec, only the two most recent reference frames are needed. For example, with reference to bitstream 200, once P frame 215 has been decoded, I frame 211 is no longer necessary; P frame 212 and P frame 215 are the two most recent reference frames. By contrast, under the H.264 scheme, there is no definite point at which a reference frame can be discarded; until a reference frame has been explicitly indicated as being unnecessary, it should remain available for aiding decoding of future frames. Under H.264, for example, I frame 211 remains necessary until some data encoded in bitstream 200 indicates otherwise, regardless of how many P frames have been subsequently decoded.

Decode Order and Playback Order

Under many video compression schemes, the order in which frames are decoded from a bitstream is not the same as the order in which they are displayed by a video playback device. For example, it is necessary to decode the reference frames for a B frame before attempting to decode the B frame itself, but the playback order may place one of the reference frames after the B frame.

Figure 3:
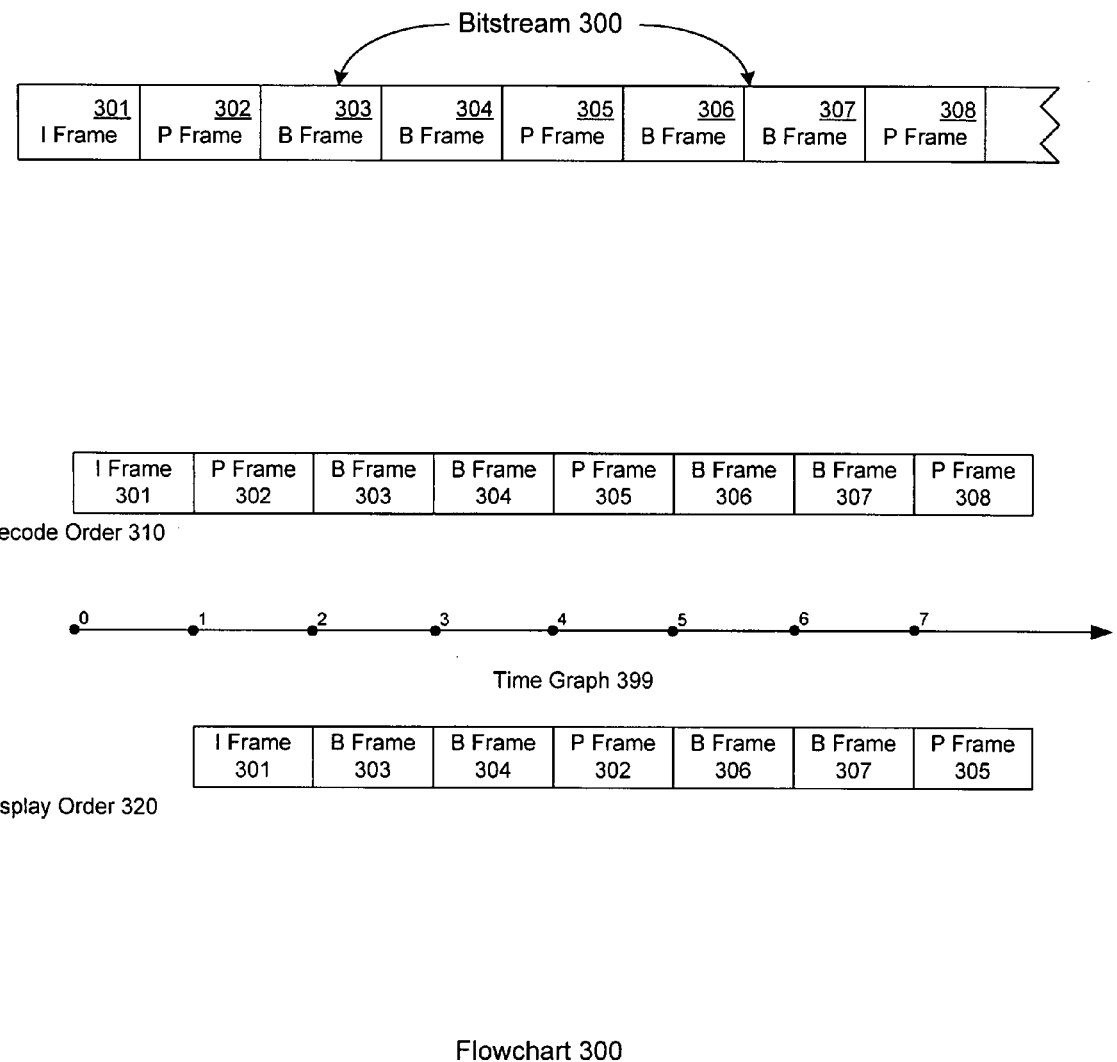
FIG. 3 is a depiction of a decode order and a display order for a bitstream, in accordance with one embodiment.

With reference to FIG. 3, a decode order 310 and a display order 320 are presented for a bitstream 300, in accordance with one embodiment. While FIG. 3 depicts specific, enumerated features, elements, and orderings, it is understood that embodiments are well suited to applications involving additional, fewer, or different features, elements, or arrangements. In particular, it is understood that the encoding, and decoding, and playback orders of frame data, as shown in FIG. 3, are intended as exemplary and illustrative only.

Bitstream 300, in the depicted embodiment, shows eight frames' worth of data: I frame 301, P frame 302, B frame 303, B frame 304, P frame 305, B frame 306, B frame 307, and P frame 308. As indicated by decode order 310, a video playback device would decode these frames in the order presented by bitstream 300. In some embodiments, bitstream 300 would be decoded in real-time, e.g., as soon as the data making up I frame 301 is received, the video playback device would decode I frame 301.

As shown in the depicted embodiment, the display order of the frames contained in bitstream 300 differs from the decode order. As indicated by display order 320, I frame 301 is displayed first, followed by B frame 303, B frame 304, P frame 302, B frame 306, B frame 307, and P frame 305. This differentiation between decode order and display order has several consequences.

First, if the compressed video is to be decompressed and displayed in real-time, the decoded frames need to be buffered before display, e.g., by delaying display by one decode cycle, as indicated by time graph 399. The one frame delay depicted in FIG. 3 allows the decoding and the display frames to remain in synchronization: that is, whenever it is time to display a P frame, the next P frame is being decoded.

Second, because the reference frames, e.g., P frames, are displayed out of order from when they are decoded, each P frame needs to be available to both the decoding portion of the video playback device and the display portion of the video playback device at the same time. For example, as shown in FIG. 3, P frame 302 is decoded at time 1, but will not be displayed until time 4. Also at time 4, P frame 302 may be needed in decoding P frame 305.

In addressing this second consequence, one of two approaches is generally utilized. Either the display element of the video playback device has its own allocated buffer, in which to duplicate decoded reference frames until it is time to display them, or the decoder is responsible for forwarding decoded frames in playback order, rather than in decode order. The first approach involves a memory duplication: the decoded reference frame already exists in a buffer held by the decoder, and is copied to a buffer used by the playback module. The second approach faces additional responsibilities upon the decoder, beyond the task of decoding.

System for Video Decoding and Display

The following embodiment describes a system for video decoding and display. The described system allows for a more uniform and memory efficient approach to several of the issues raised by video decoding and display, such as the problems introduced by the difference in decode order and display order of frame data.

Figure 4:
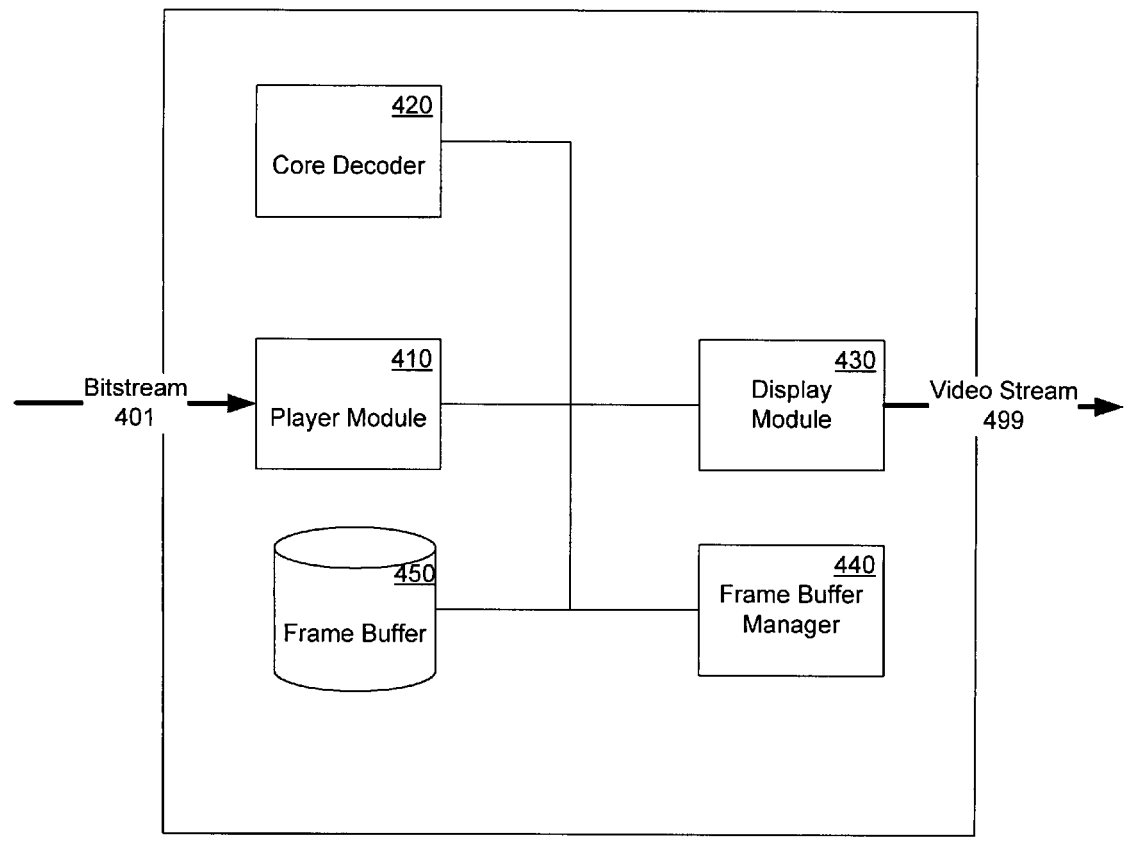
FIG. 4 is a block diagram of a system for video decoding and display, in accordance with one embodiment.

With reference now to FIG. 4, a system 400 for video decoding and display is described, in accordance with one embodiment. While system 400 is depicted as including specific, enumerated features, elements, and arrangements, it is understood that embodiments are well suited to applications involving additional, fewer, or different features, elements, or arrangements. Further, it is understood that the functionality attributed to the elements of system 400 may be combined into fewer elements, or spread across additional elements, in different embodiments.

System 400 incorporates player module 410, core decoder 420, display module 430, frame buffer manager 440, and frame buffer module 450. Player module 410, in the depicted embodiment, facilitates the passing of information between other modules within system 400. Core decoder 420 provides the necessary decoding functionality to decode compressed video data, e.g., received via bitstream 401. In some embodiments, multiple core decoders 420 may be utilized, to support multiple video compression schemes; alternatively, in some embodiments, a single core decoder 420 may support several video compression schemes. Display module 430, in the depicted embodiment, outputs the decoded frame information in an appropriate playback order, e.g., by outputting to video stream 499.

System 400 is also shown as including frame buffer manager 440. Frame buffer manager 440 is used to allocate and manage access to frame buffer module 450. Moreover, in some embodiments, frame buffer manager 440 recycles unneeded frame buffers, e.g., after display module 430 has output the frame stored in that frame buffer to video stream 499. Frame buffer module 450, in turn, is used to store information, e.g., decoded frames of video data. In some embodiments, the use of frame buffer manager 440 in combination with a single frame buffer module 450 increases the efficient operation of system 400, e.g., by eliminating the need for redundant copying of reference frames between the core decoder and the display module.

Additionally, in some embodiments, the functionality of system 400 has been segregated, such that core decoder 420 is platform independent. Unlike a traditional decoding and playback module, core decoder 420 need not be programmed with platform specific actions, such as memory or buffer access; instead, platform dependent actions are carried out by player module 410, frame buffer manager 440, and display module 430. In this way, development of additional decoding and display devices is facilitated, by allowing complete reuse of core decoder 420.

Method of Decoding and Displaying Compressed Video Data

Figure 5:
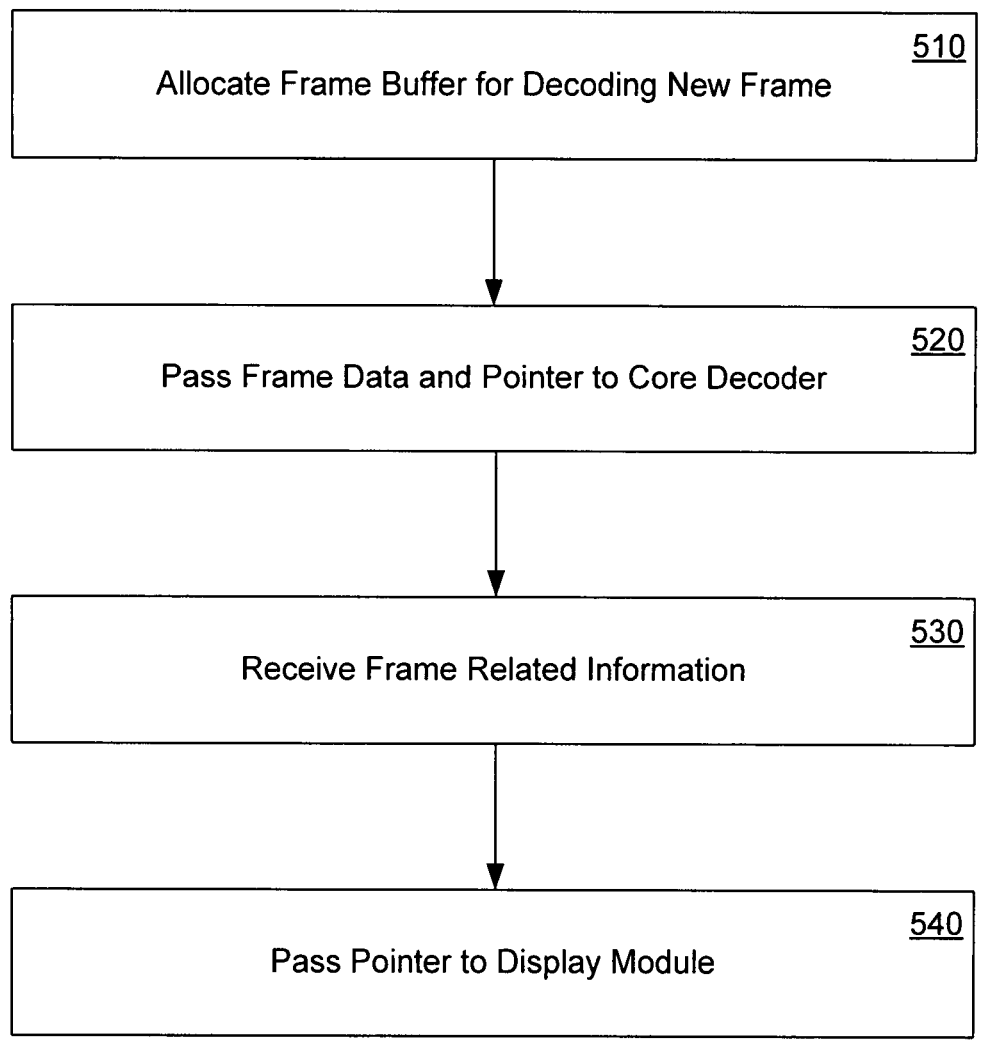
FIG. 5 is a flowchart of an exemplary process of decoding and displaying compressed video data, in accordance with one embodiment.

With reference now to FIG. 5, a flowchart 500 of an exemplary method of decoding and displaying compressed video data is depicted, in accordance with one embodiment.

With reference now to step 510, a frame buffer manager allocates a frame buffer for use in decoding received compressed frame data. In the depicted embodiment, the frame buffer manager provides access to the frame buffers. As each new compressed frame is received, e.g., by a player module, a frame buffer is allocated for that frame. This frame buffer may be newly allocated, or maybe a recycled frame buffer, e.g., a frame buffer previously allocated to a frame which is longer needed. In different embodiments, different approaches are utilized during this step. One such embodiment is set forth below, with reference to FIG. 6.

For example, with reference to FIG. 4, when a new frame is received via bitstream 401, player module 410 requests a frame buffer allocation from frame buffer manager 440. Frame buffer manager 440 allocates a frame buffer for the new frame, and returns a pointer to player module 410.

With reference to step 520, the frame data and the frame buffer pointer are passed to a core decoder for decoding, along with any other necessary information. In some embodiments, once a frame buffer has been allocated for the frame, the compressed frame information is passed to the core decoder, along with the pointer for the allocated frame buffer. The core decoder will decode the compressed frame data, with reference to any appropriate reference frames.

Continuing the above example, player module 410 passes the compressed frame data to core decoder 420, along with the pointer to the allocated frame buffer.

With reference to step 530, after decoding, the core decoder returns frame related information to the player module. In some embodiments, e.g., where the H.264 scheme is utilized, the core decoder may need to provide information for the display module as a "hint," in order to indicate which frames should be displayed in which order. In such an embodiment, the core decoder may provide POC (picture order count) information, to indicate the ordering.

Moreover, in some embodiments, the core decoder maintains an internal frame buffer usage table, e.g., to identify where reference frames are stored. In one such embodiment, the core decoder will also provide an updated frame buffer usage table, in order to identify any reference frames which may be recycled. Under the H.264 scheme, if a reference frame is no longer necessary, information contained in the bitstream will so indicate; for other schemes, reference frames may become unnecessary after a preset number of additional frames are decoded. Similarly, if the newly decoded frame is a reference frame, its location will be added to the core decoder's frame buffer usage table.

Continuing the above example, core decoder 420 outputs frame related information to player 410. Core decoder 420 may also output POC information. Core decoder 420 may also provide an updated frame buffer usage table, indicating any frame buffers which can be recycled, and/or whether the newly decoded frame is a reference frame.

With reference now to step 540, a player module passes the relevant information to the display module. In some embodiments, such information will include the pointer to the frame buffer where the decoded frame is stored. Further, in some embodiments, the player module may also forward any POC information, to aid the display module in determining which frames to output in which order.

Concluding the above example, player module 410 provides display module 430 with the POC information relating to the newly decoded frame, and the pointer to the frame buffer in which the decoded frame is stored. Display module 430 can then output the decoded frame to video stream 499 at the appropriate time.

Method of Operation of a Frame Buffer Manager

Figure 6:
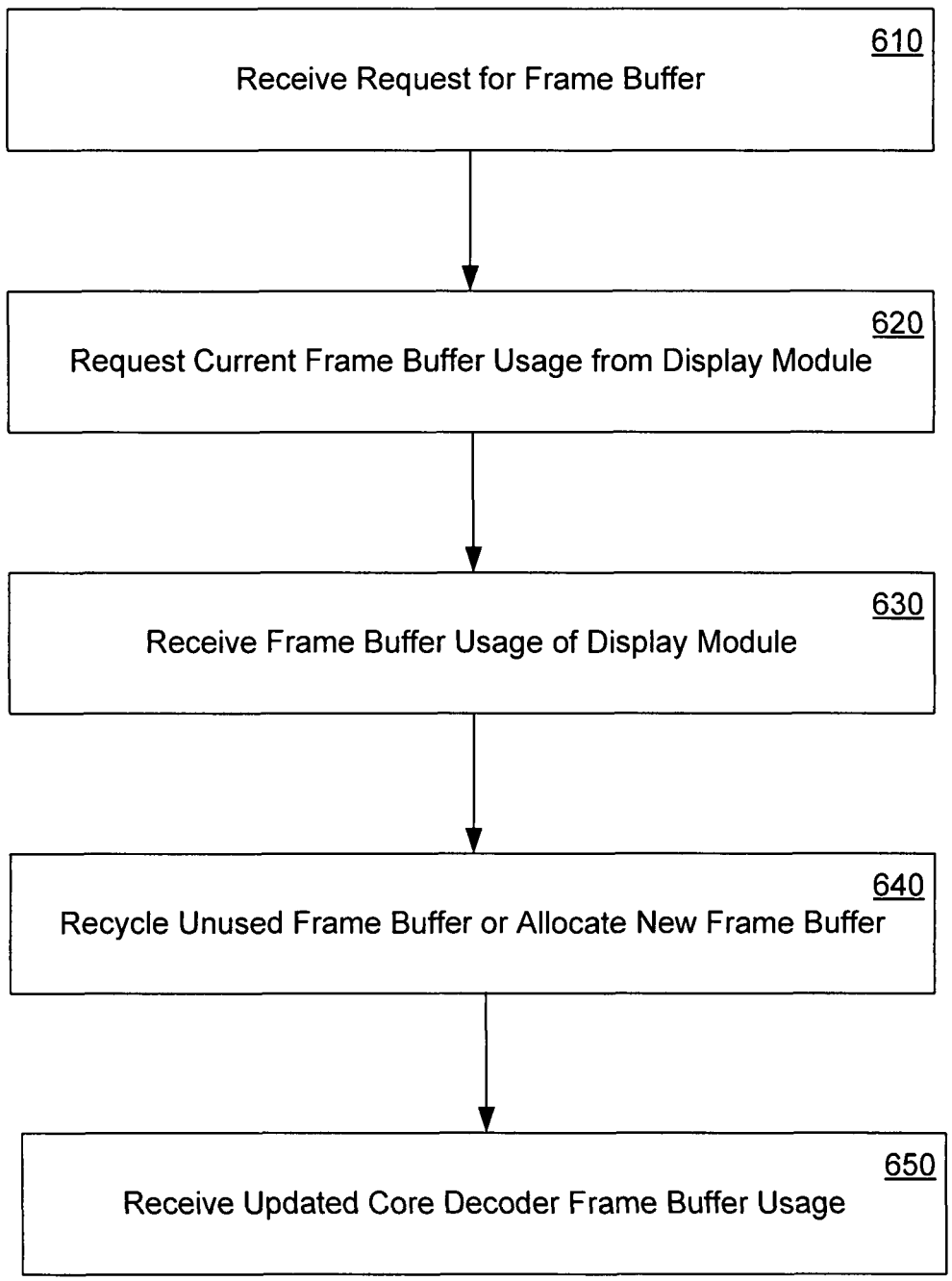
FIG. 6 is a flowchart of an exemplary process of operation of a frame buffer manager, in accordance with one embodiment.

With reference now to FIG. 6, a flowchart 600 of a method of operation of a frame buffer manager is depicted, in accordance with one embodiment.

With reference now to step 610, a request for a frame buffer is received. In some embodiments, such a request will be transmitted by a player module, upon receipt of one frame's worth of data from a compressed video bitstream. For example, player module 410 may transmit such a request to frame buffer manager 440, when compressed data corresponding to one frame is received via bitstream 401.

With reference now to step 620, the frame buffer manager requests the current frame buffer usage from a display module. In some embodiments, as a display module displays (or consumes) the decoded frames stored in frame buffers, those frame buffers may be recycled. In the depicted embodiment, the frame buffer manager checks with the display module to determine if one or more frame buffers is ready to be recycled. For example, frame buffer manager 440 requests the current frame buffer usage for display module 430.

With reference now to step 630, the frame buffer usage of the display module is received by the frame buffer manager. In some embodiments, the display module may return a list of frame buffers which are ready to be recycled, rather than a complete list of its current frame buffer usage. For example, display module 430 returns its current frame buffer usage to frame buffer manager 440.

With reference now to step 640, the frame buffer manager recycles an unused frame buffer for use by the new frame; if no such unused frame buffer is ready for recycling, the frame buffer manager allocates a new frame buffer for the new frame. In some embodiments, a newly assigned frame buffer is associated with a frame identifier (frame ID), which serves as a pointer to the memory address of the frame buffer. The frame buffer manager may maintain a table of mappings between these frame IDs and allocated frame buffers.

Further, in some embodiments, a frame buffer limit may exist. In such an embodiment, if frame buffer usage reaches the maximum limit, the frame buffer manager may loop back to step 620 and repeat steps 620 and 630 until a frame buffer becomes available. Such a scenario may occur if, for example, frames are being decoded faster than they are being displayed.

For example, frame buffer manager 440 recycles a frame buffer previously in use by display module 430 for use with the newly received frame, and associates a frame ID with that frame buffer. This frame ID is returned to player module 410.

With reference now to step 650, the frame buffer manager receives updated core decoder frame buffer usage information. In some embodiments, when the core decoder no longer requires a reference frame stored in a frame buffer, it may update its frame buffer usage information. The unneeded frame buffer can then be recycled by the frame buffer manager, e.g., by adding the frame buffer to an internal list of available frame buffers, and assigning the frame buffer to a new frame at a later time.

For example, after core decoder 420 decodes a decompressed frame, it passes updated frame buffer usage information to player module 410, indicating that a reference frame stored in a frame buffer is no longer needed. Player module 410 then passes this updated frame buffer usage information to frame buffer manager 440, which updates an internal listing of available frame buffers, to indicate that the frame buffer may be recycled.

Dataflow Diagram of Decoding One Frame of Video

Figure 7:
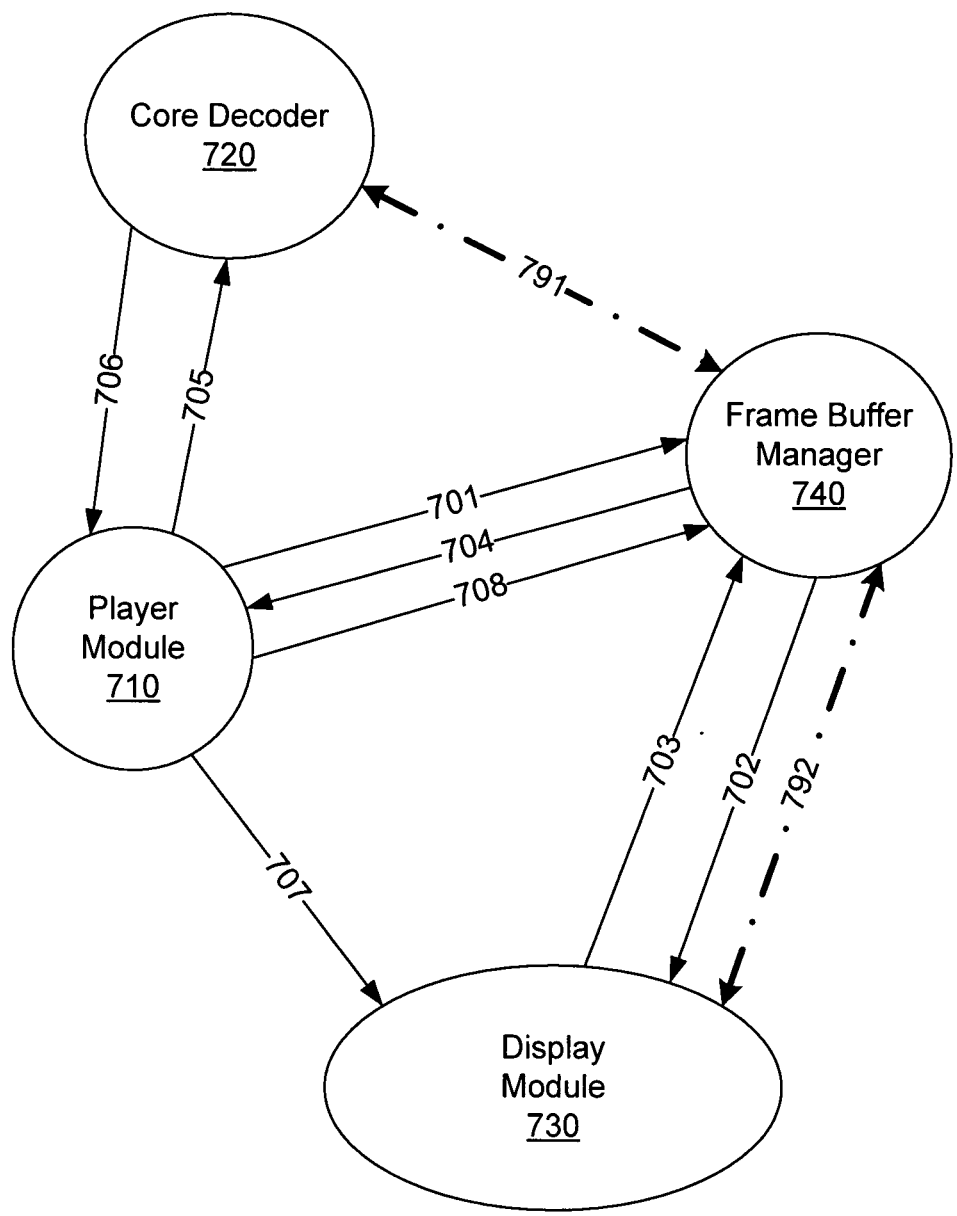
FIG. 7 is a data flow diagram of an exemplary process of decoding and displaying compressed video data, in accordance with one embodiment.

With reference now to FIG. 7, an exemplary dataflow diagram 700 is depicted, in accordance with one embodiment. Dataflow diagram 700 depicts a series of interactions between the modules of a video playback device, when decoding one frame of compressed video.

When a frame of compressed video reaches a video playback device, a player module, such as player module 710, receives it. Upon receiving a frame of compressed video data, player module sends a request for a frame buffer to frame buffer manager 740, as indicated by arrow 701.

In the depicted embodiment, frame buffer manager 740, upon receiving such a request, checks with display module 730 for its current frame buffer usage, as indicated by arrow 702. Display module 730 responds with its current frame buffer usage, as indicated by arrow 703.

Frame buffer manager 740 allocates a frame buffer for the newly received frame. If a frame buffer exists, which is not in use by the core decoder or display module, frame buffer manager 740 will recycle the existing frame buffer. Otherwise, frame buffer manager 740 will allocate a new frame buffer, unless a limit on frame buffer usage has been reached. In this latter case, frame buffer manager 740 may continue polling display module 730, until an existing frame buffer is ready to be recycled.

Frame buffer manager 740 will assign a frame identifier (frame ID) to the allocated frame buffer, and pass the frame ID back to player module 710, as indicated by arrow 704.

Player module 710 passes the compressed frame of video data and the frame ID to core decoder 720, as indicated by arrow 705. Core decoder 720 will decode the compressed frame of data, and will write the decompressed data to the allocated frame buffer. Core decoder 720 may need to check with frame buffer manager 740, in order to map the assigned frame ID to a memory location, as indicated by arrow 791.

After decoding, core decoder 720 will return any frame related information, such as POC data, and any updated frame buffer usage to player module 710, as indicated by arrow 706.

In the depicted embodiment, player module 710 will pass the frame related information and the frame ID to a display module, such as display module 730, as indicated by arrow 707. Display module 730 will use the frame related information to determine a playback order of decoding frames. Display module 730 may need to reference frame buffer manager 740, in order to map the assigned frame ID to the memory location where the decoded frame is stored, as indicated by arrow 792.

Player module 710 may also pass the core decoder's frame buffer usage information to frame buffer manager 740, as indicated by arrow 708. Frame buffer manager 740 may use a core decoder's frame buffer usage information to update an internal list of available frame buffers.

Embodiments of the present invention are thus described. While the present invention has been described in particular embodiments, it should be appreciated that the present invention should not be construed as limited by such embodiments, but rather construed according to the following claims.

What is claimed is:

1. A method of decoding and displaying compressed video data, said method comprising:

accessing a compressed video frame in a bitstream;

selecting, with a frame buffer manager, a frame buffer from a plurality of available frame buffers, each of said available frame buffers for receiving a respective decompressed video frame of data;

requesting said frame buffer from said frame buffer manager, wherein said frame buffer manager, upon receiving the request for said frame buffer: updates a listing comprising a plurality of available frame buffers, each of said available frame buffers operable for receiving a respective decompressed video frame; determines when said listing includes an unneeded frame buffer that is available for recycling; recycles said unneeded frame buffer for use as said frame buffer, when said unneeded frame buffer is available; and allocates said frame buffer from available memory, when said unneeded frame buffer is not available;

assigning a frame identifier to said frame buffer producing an assigned frame identifier, wherein said assigned frame identifier serves as a pointer to a memory address of said frame buffer;

decoding said compressed video frame into a decompressed video frame that is stored in said frame buffer, wherein said assigned frame identifier is used to identify which of said frame buffers is to receive said decompressed video frame; and passing said assigned frame identifier to a display module that outputs a video stream comprising said decompressed video frame.

2. The method of claim 1, further comprising:
receiving frame related information.

3. The method of claim 2, wherein said frame related information comprises picture order count (POC) information.

4. The method of claim 1, further comprising:
receiving an updated frame buffer usage list, comprising a list of a plurality of assigned frame identifiers, wherein each of said plurality of assigned frame identifiers is associated with a respective frame buffer.

5. The method of claim 1, further comprising:
accessing a second compressed video frame in said bitstream;
selecting a second frame buffer from said plurality of available frame buffers;
assigning a second frame identifier to said second frame buffer; and
decoding said second compressed video frame to produce a second decompressed video frame that is stored in said second frame buffer.

6. A system for video decoding, said system comprising:
a player module for receiving a bitstream of compressed video data, and for passing information;
a core decoder, coupled to said player module, for decoding said compressed video data into decompressed video data;
a display module, coupled to said player module, for outputting a video stream comprising said decompressed video data;
a frame buffer manager, coupled to said player module, for selecting a frame buffer from a plurality of frame buffers; and
a frame buffer module, coupled to said player module, comprising said plurality of frame buffers, wherein said bitstream of compressed video data comprises a plurality of compressed video frames, wherein said player module is configured, upon receiving a compressed video frame of said plurality of compressed video frames, to request said frame buffer from said frame buffer manager,
wherein said frame buffer manager, upon receiving the request for said frame buffer: updates a listing comprising a plurality of available frame buffers, each of said available frame buffers for receiving a respective decompressed video frame; determines when said listing includes an unneeded frame buffer that is available for recycling; recycles said unneeded frame buffer for use as said frame buffer, when said unneeded frame buffer is available; and allocates said frame buffer from available memory, when said unneeded frame buffer is not available;

and wherein further said frame buffer manager is configured to associate an assigned frame identifier with said frame buffer, said assigned frame identifier comprising a pointer to said frame buffer, said core decoder using said assigned frame identifier to identify which of said frame buffers is to receive a decompressed frame of video data, wherein said player module is further configured to pass said assigned frame identifier to said display module.

7. The system of claim 6, wherein said player module is further configured to pass said compressed video frame and said assigned frame identifier to said core decoder.

8. The system of claim 7, wherein said player module is further configured to receive frame information from said core decoder, and to pass said frame information to said display module.

9. The system of claim 6, wherein said compressed video data comprises data substantially in accordance with a version of the H.264 video standard.

10. The system of claim 6, further comprising:
a plurality of core decoders, coupled to said player module, wherein said plurality of core decoders are for decoding said compressed video data in accordance with a plurality of different video standards.

11. The system of claim 6, wherein said core decoder is platform independent.

12. A method comprising:
accessing a compressed video data frame in a bitstream;
receiving a request for a frame buffer, wherein said frame buffer is selected from a plurality of frame buffers;
in response to receiving said request, updating a listing comprising a plurality of available frame buffers, each of said available frame buffers for receiving a respective decompressed video frame;
determining when said listing includes an unneeded frame buffer available for recycling;
recycling said unneeded frame buffer for use as said frame buffer, when said unneeded frame buffer is available;
allocating said frame buffer from available memory, when said unneeded frame buffer is not available;
assigning a frame identifier to said frame buffer producing an assigned frame identifier;
decoding said compressed video data frame into a decompressed video frame and storing said decompressed video frame in said frame buffer; and
passing said decompressed video frame and said assigned frame identifier to a display module, wherein said assigned frame identifier serves as a pointer to a memory address of said frame buffer and is used to identify which of said frame buffers is to receive said decompressed video frame, wherein said display module accesses said decompressed video frame in said frame buffer using said assigned frame identifier and outputs a video stream comprising said decompressed video frame.

13. The method of claim 12, wherein said determining comprises:
requesting a current frame buffer usage from a display module;
receiving said the current frame buffer usage from said display module; and receiving an updated core decoder frame buffer usage from a core decoder.

* * * * *